United States Patent
Mehta

(10) Patent No.: US 11,835,250 B2
(45) Date of Patent: Dec. 5, 2023

(54) METHOD AND A SYSTEM FOR PERFORMING CALIBRATION OF VARIABLE AIR VOLUME (VAV) UNITS

(71) Applicant: Carrier Corporation, Palm Beach Gardens, FL (US)

(72) Inventor: Rohan Ajinkya Mehta, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 413 days.

(21) Appl. No.: 17/113,597

(22) Filed: Dec. 7, 2020

(65) Prior Publication Data

US 2021/0215379 A1    Jul. 15, 2021

(30) Foreign Application Priority Data

Jan. 9, 2020   (IN) .............................. 202011001032

(51) Int. Cl.
*F24F 11/77* (2018.01)
*F24F 3/044* (2006.01)
*F24F 140/40* (2018.01)
*F24F 110/30* (2018.01)

(52) U.S. Cl.
CPC ............ *F24F 11/77* (2018.01); *F24F 3/0442* (2013.01); *F24F 2110/30* (2018.01); *F24F 2140/40* (2018.01)

(58) Field of Classification Search
CPC ........ F24F 11/77; F24F 11/49; F24F 2110/40; F24F 2110/30; F24F 2140/40; F24F 3/0442; Y02B 30/70
See application file for complete search history.

(56) References Cited

U.S. PATENT DOCUMENTS

| | | | | |
|---|---|---|---|---|
| 4,724,678 A * | 2/1988 | Pohl | ...................... | F25D 21/006 62/154 |
| 4,838,483 A * | 6/1989 | Nurczyk | ................ | G05D 23/20 236/94 |
| 4,931,948 A * | 6/1990 | Parker | ...................... | F24F 11/88 236/1 C |
| 5,179,524 A * | 1/1993 | Parker | ...................... | F24F 11/77 165/238 |
| 6,108,614 A * | 8/2000 | Lincoln | .................... | F24F 11/52 702/183 |
| 9,605,860 B2 * | 3/2017 | Cheung | ................ | F24F 11/0001 |

(Continued)

*Primary Examiner* — Nelson J Nieves
(74) *Attorney, Agent, or Firm* — CANTOR COLBURN LLP

(57) ABSTRACT

Aspects of the invention are directed towards a system and a method for performing calibration of variable air volume (VAV) units. One or more embodiments of the invention describe the method comprising steps of turning off a fan of an air handling unit and calibrating one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts and determining a reference airflow value of the one or more reference VAV units. The method also describes a step of calibrating other airflow sensors associated with other variable air volume (VAV) units based on the reference airflow value.

20 Claims, 9 Drawing Sheets

(56) References Cited

U.S. PATENT DOCUMENTS

| | | | | |
|---|---|---|---|---|
| 11,607,635 B2 * | 3/2023 | Arthur | ............. | B01D 46/446 |
| 2011/0284091 A1 * | 11/2011 | Livchak | ............. | F24C 15/2042 |
| | | | | 126/299 R |
| 2013/0010820 A1 * | 1/2013 | Curtis | ............. | G02B 27/48 |
| | | | | 372/23 |
| 2013/0308674 A1 * | 11/2013 | Kramer | ............. | G01N 25/72 |
| | | | | 374/4 |
| 2015/0136430 A1 * | 5/2015 | Livchak | ............. | F24C 15/2021 |
| | | | | 169/61 |
| 2018/0140989 A1 * | 5/2018 | Arthur | ............. | B01D 46/521 |
| 2019/0145644 A1 * | 5/2019 | Karamanos | ............. | F24F 11/75 |
| | | | | 700/276 |
| 2020/0256578 A1 * | 8/2020 | Meis | ............. | B01D 46/429 |
| 2020/0326088 A1 * | 10/2020 | Mowris | ............. | G05B 19/042 |
| 2021/0071885 A1 * | 3/2021 | Hutz | ............. | H04L 12/2834 |

* cited by examiner

| TEST AND BALANCE | LOCKS | DESIGN VALUES |

DAMPER OPEN POSITION: 30%   AUX HEAT: 0%
FLOW SETPOINT: 224 CFM   DISCHARGE AIR TEMP: ? UNK
FAN: ON

🔓 ☐ LOCK FLOW SETPOINT AT [ 0 ]
🔒 ☑ LOCK DAMPER OPEN AT [ 30 ]%
🔓 ☐ LOCK DAMPER AT CURRENT OPEN POSITION
☐ LOCK AUX HEAT AT [ 0 ]%
☐ LOCK FAN [ ON ▽ ]

[APPLY] [CANCEL]

Site Tree

- SITE
  - AHJ1
  - AHJ2
  - AHJ3
    - VAV6
    - VAV7
    - VAV8
    - VAV9
    - VAV10
  - AHJ4
    - VAV11
    - VAV12
    - VAV13
    - VAV14
    - VAV15
    - VAV16
    - VAV17
    - VAV18
    - VAV19
    - VAV20
  - AHJ5
    - VAV21
    - VAV22
    - VAV23
    - VAV24
    - VAV25
    - VAV26
    - VAV27
    - VAV28
    - VAV29
    - VAV30
    - VAV31
    - VAV32
    - VAV33
    - VAV34
    - VAV35
    - VAV36
    - VAV37
    - VAV38
    - VAV39
    - VAV40
    - VAV41
    - VAV42
    - VAV43
    - VAV44
    - VAV45
    - VAV46
    - VAV47
    - VAV48
    - VAV49
    - VAV50

TEST AND BALANCE | SMART TEST & BALANCE

ASSIGN AIRFLOW ▽
SELECT INTERNAL AIRFLOW POINT
CREATE USING STEP MEASURE

INITIATE SMART COOL MAX BALANCING
ABORT

AHU FAN SPEED: 30%
AHU STATIC PRESSURE: 1.5 INWC
AHU AIRFLOW: 4000 CFM
ALL VAV TOTAL AIRFLOW: 3900 CFM
LEAKAGE AIRFLOW: 50 CFM
CALIBRATING VAV CALCULATED AIRFLOW: 850 CFM
CALIBRATING VAV AIRFLOW MEASURED VALUE &
SENSOR VALUE DIFFERENCE: 50 CFM

ALL VAV SERVED BY AHU4 STAUS TABLE

| VAVS | CHECK REFERENCE VAVS | DAMPER | AIRFLOW | AIRFLOW SETPOINT | CALIBRATION STATUS |
|---|---|---|---|---|---|
| VAV11 | ☑ | 100% | 1500 CFM | 1500 CFM | DONE (MANUALLY) |
| VAV12 | ☑ | 98% | 1600 CFM | 1600 CFM | DONE (MANUALLY) |
| VAV13 | ☐ | 0% | 0 CFM | 1000 CFM | DONE |
| VAV14 | ☐ | 0% | 0 CFM | 900 CFM | DONE |
| VAV15 | ☐ | 90% | 800 CFM | 800 CFM | UNDER PROGRESS |
| VAV16 | ☐ | 0% | 0 CFM | 700 CFM | PENDING |
| VAV17 | ☐ | 0% | 0 CFM | 700 CFM | PENDING |
| VAV18 | ☐ | 0% | 0 CFM | 500 CFM | PENDING |
| VAV19 | ☐ | 0% | 0 CFM | 500 CFM | PENDING |
| VAV20 | ☐ | 0% | 0 CFM | 300 CFM | PENDING |

FIG. 5E

METHOD AND A SYSTEM FOR PERFORMING CALIBRATION OF VARIABLE AIR VOLUME (VAV) UNITS

CROSS-REFERENCE TO RELATED APPLICATIONS

This application claims priority to Indian Patent Application No. 202011001032, filed on Jan. 9, 2020, the contents of which are incorporated by reference herein in their entirety.

TECHNICAL FIELD OF INVENTION

The present invention generally relates to heating, ventilation, and air conditioning (referred hereinafter as "HVAC") system. More particularly, the invention relates to a system and a method for performing calibration of variable air volume (VAV) units in the HVAC system.

BACKGROUND OF THE INVENTION

Heating, ventilation, and air conditioning (HVAC) system is used in residential/commercial places for cooling or heating a building. In order to maintain cooling or heating in the building, the HVAC system uses an air handling unit (AHU) and one or more variable air volume (referred hereinafter as "VAV") units. Each of the VAV units may use diffusers to serve different zones/areas of the building. Particularly, each zone of the building may have a few diffusers connected with a VAV unit for maintaining a desired temperature in that zone. This helps in maintaining different cooling or heating temperature at the same time in various zones of the building. At the time of commissioning of VAV units with controllers or if a VAV unit is not able to maintain a desired temperature in a particular zone, then, air balancing of the VAV or the diffusers connected to that VAV may be performed. The process of air balancing may involve testing, adjusting and balancing (i.e. VAV controller airflow sensor calibration) the flow of air in each VAV unit, as desired.

Existing solutions to perform the air balancing requires a balancer or a technician to perform the air balancing using a hood. The balancer needs to open and test each VAV unit for checking airflow at each VAV unit. The air balancing also involves calibration of airflow sensors of the VAV unit, calibration of fan/s of the air handling unit and/or calibration of the VAV unit to check if the right amount of air is provided in a particular zone for maintaining a desired temperature in that zone. Such calibration is a time-consuming task and manually intensive since the balancer has to visit each VAV unit to perform calibration.

In view of the afore-mentioned problems, there is a need of an efficient and effective system and a method for performing calibration of variable air volume (VAV) units in a HVAC system. There is also a requirement to reduce the time taken for manually calibrating each VAV unit to perform air balancing. In order to solve the problems in the existing solutions, a system and a method are disclosed.

SUMMARY

Various embodiments of the invention describe a system for performing calibration of variable air volume (VAV) units in a HVAC system. The system comprises an air handling unit and a calibration unit. The air handling unit is connected to one or more supply ducts and the one or more supply ducts are connected to a plurality of variable air volume (VAV) units. Also, each of the plurality of variable air volume (VAV) units comprises at least one airflow sensor. The calibration unit is adapted to turn off a fan of the air handling unit and initiate zero flow balancing for each of the plurality of variable air volume (VAV) units. The calibration unit is also adapted to calibrate one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts. The calibration unit is further adapted to determine a reference airflow value of the one or more reference variable air volume (VAV) units and calibrate other airflow sensors associated with other variable air volume (VAV) units of the plurality of variable air volume (VAV) units based on the reference airflow value of the one or more reference variable air volume (VAV) units.

In an embodiment of the invention, the step measure technique is configured to receive a value of maximum revolutions per minute (RPM) of the fan and determine a value of maximum cubic feet per minute (CFM) based on the value of maximum RPM of the fan. The step measure technique is also configured to open a damper associated with each of the plurality of variable air volume (VAV) units and switch on the fan to modulate at minimum speed. The step measure technique is configured to receive a value of the airflow of the one or more supply ducts of the air handling unit, determine a value of fan speed based on the value of the airflow of the one or more supply ducts of the air handling unit and display a RPM value for the maximum cubic feet per minute (CFM) based on the value of the fan speed. The step measure technique is further configured to receive an input to use the determined value of the fan speed as the reference airflow value or receive an input to determine a new value of fan speed. The step measure technique is configured to modulate the fan speed to determine a new value of the fan speed based on a new value of the airflow if the input to determine the new value of the fan speed is received.

In a different embodiment of the invention, the value of the maximum CFM is based on a maximum cooling airflow setpoint of the one or more reference variable air volume (VAV) units and a largest of maximum cooling airflow setpoint of the other variable air volume (VAV) units.

In an embodiment of the invention, the calibration of the one or more airflow sensors associated with the one or more reference variable air volume (VAV) units and the other sensors associated with the other variable air volume (VAV) units is allowed within a range of an error percentage.

In another embodiment of the invention, the calibration of the one or more airflow sensors associated with the one or more reference variable air volume (VAV) units are performed by maintaining minimum fan speed to keep the other variable air volume (VAV) units closed.

In yet another embodiment of the invention, the calibration unit is adapted to calibrate the other airflow sensors associated with the other variable air volume (VAV) units by setting the other variable air volume (VAV) units to maximum flow setpoint and determining a value of the airflow of the air handling unit. Further, the calibration of the other sensors comprises determining fan speed & determining a total airflow of the air handling unit. The calibration of the other sensors also comprises determining an airflow of a current VAV based on a difference of the value of the airflow of the air handling unit, a leakage airflow and the reference airflow value. The calibration of the other sensors comprises determining a maximum flow calibration offset CFM value based on a difference of the airflow of the current VAV and a measured value of the current VAV.

In another embodiment of the invention, the calibration unit is adapted to abort the calibration of the plurality of variable air volume units when a safety alarm is detected or an alarm/abort button is pressed.

In still another embodiment of the invention, the system provides an alarm when the leakage airflow reaches above a pre-defined or user-adjustable threshold.

In a different embodiment of the invention, the air handling unit is adapted to display a current airflow for the fan speed.

In yet another embodiment of the invention, each of the plurality of variable air volume units is connected to one or more diffusers.

Various embodiments of the invention describe a method for performing calibration of variable air volume (VAV) units in a HVAC system. The method comprises steps of turning off a fan of an air handling unit and initiating zero flow balancing for each of a plurality of variable air volume (VAV) units. The method also comprises steps of calibrating one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts. The method further comprises steps of determining a reference airflow value of the one or more reference variable air volume (VAV) units and calibrating other airflow sensors associated with other variable air volume (VAV) units of the plurality of variable air volume (VAV) units based on the reference airflow value of the one or more reference variable air volume (VAV) units.

In an embodiment of the invention, the step measure technique further comprises steps of receiving a value of maximum revolutions per minute (RPM) of the fan and determining a value of maximum cubic feet per minute (CFM) based on the value of maximum RPM of the fan. The step measure also comprises steps of opening a damper associated with each of the plurality of variable air volume (VAV) units and switching on the fan to modulate at minimum speed. The step measure technique comprises steps of receiving a value of the airflow of the one or more supply ducts of the air handling unit, determining a value of fan speed based on the value of the airflow of the one or more supply ducts of the air handling unit and displaying a RPM value for the maximum cubic feet per minute (CFM) based on the value of the fan speed. The step measure technique comprises steps of receiving an input to use the determined value of the fan speed as the reference airflow value or receiving an input to determine a new value of fan speed. The step measure technique comprises steps of modulating the fan speed to determine a new value of the fan speed based on a new value of the airflow if the input to determine the new value of the fan speed is received.

In a different embodiment of the invention, the value of the maximum CFM is based on a maximum cooling airflow setpoint of the one or more reference variable air volume (VAV) units and a largest of maximum cooling airflow setpoint of the other variable air volume (VAV) units.

In yet another embodiment of the invention, the calibration of the one or more airflow sensors associated with the one or more reference variable air volume (VAV) units and other sensors associated with the other variable air volume (VAV) units is allowed within a range of an error percentage.

In an embodiment of the invention, the calibration of the one or more air flow sensor associated with the one or more reference variable air volume (VAV) units are performed by maintaining minimum fan speed to keep the other variable air volume (VAV) units closed.

In yet another embodiment of the invention, the calibration of the other airflow sensors associated with the other variable air volume (VAV) units comprises the steps of setting the other variable air volume (VAV) units to maximum flow setpoint and determining a value of the airflow of the air handling unit. Further, the calibration of the other sensors also comprises steps of determining fan speed & determining a total airflow of the air handling unit. The calibration of the other sensors comprises steps further comprises determining an airflow of a current VAV based on a difference of the value of the airflow of the air handling unit, a leakage airflow and the reference airflow value. The calibration of the other sensors comprises steps of determining a maximum flow calibration offset CFM value based on a difference of the airflow of the current VAV and a measured value of the current VAV.

In another embodiment of the invention, the calibration unit is adapted to abort the calibration of the plurality of variable air volume units when a safety alarm is detected or an alarm/abort button is pressed.

In yet another embodiment of the invention, an alarm is provided when the leakage airflow reaches above a pre-defined or user-adjustable threshold. Also, the air handling unit is adapted to display a current airflow for the fan speed.

In another different embodiment of the invention, a computer readable medium is disclosed for performing calibration of variable air volume (VAV) units in a HVAC system. The computer readable medium comprises one or more processors and a memory is coupled to the one or more processors, the memory stores instructions executed by the one or more processors. The one or more processors are configured to turn off a fan of an air handling unit and initiate zero flow balancing for each of a plurality of variable air volume (VAV) units. The one or more processors are also configured to calibrate one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts. The one or more processors are further configured to determine a reference airflow value of the one or more reference variable air volume (VAV) units and calibrate other airflow sensors associated with other variable air volume (VAV) units of the plurality of variable air volume (VAV) units based on the reference airflow value.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 5B depicts "Locks" tab in calibration unit, FIG. 5C depicts "Design Value" tab in calibration unit 110, FIG. 5D depicts "Test and Balance" tab in calibration unit for performing calibration of AHU and FIG. 5E depicts "Smart Test and Balance" tab in calibration unit according to an exemplary embodiment of the invention.

Corresponding reference numerals indicate corresponding parts throughout the drawings.

DETAILED DESCRIPTION

Figure 1:
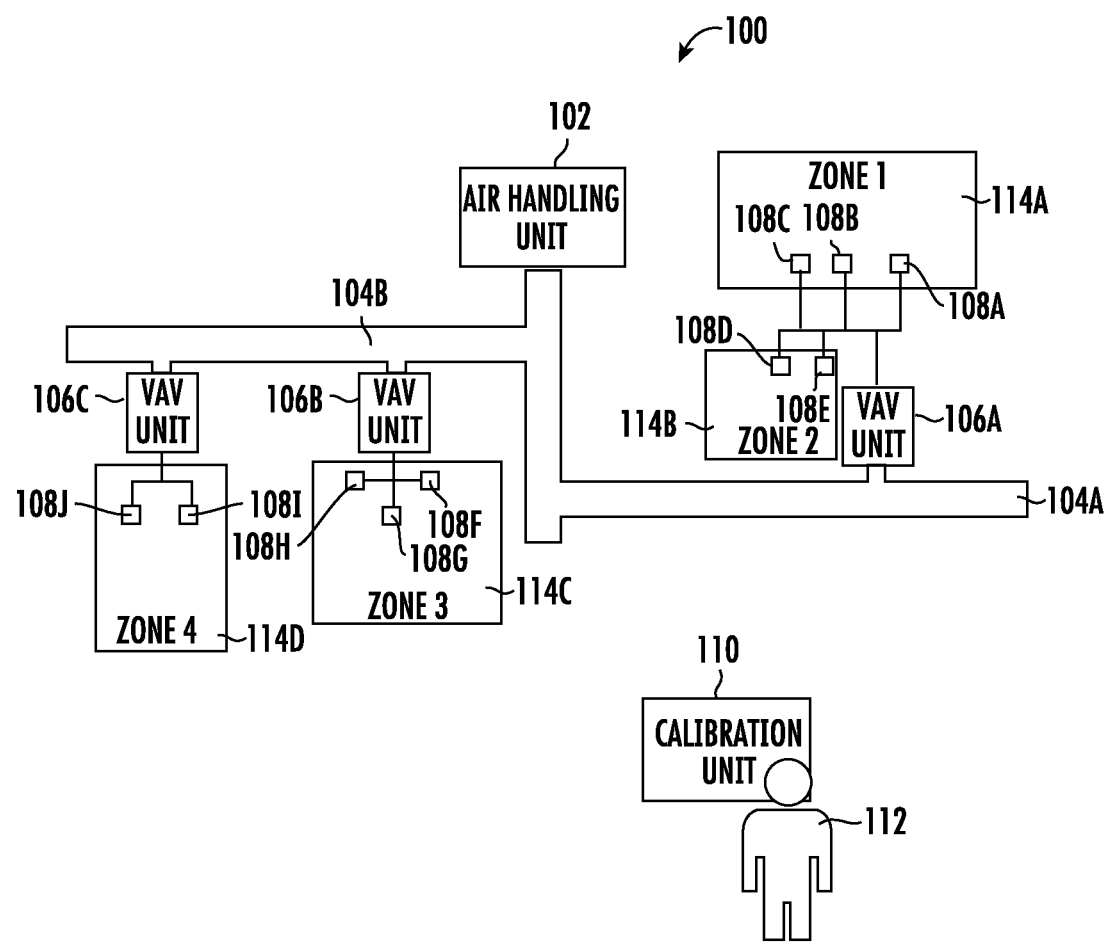
FIG. 1 depicts an exemplary system architecture according to an exemplary embodiment of the invention.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Described herein is the technology with a system and a method for performing calibration of variable air volume (VAV) units in a HVAC system. An air handling unit (referred hereinafter as "AHU") of the HVAC system may be positioned on a roof or outside of a building or inside the building near any serving area. The AHU may be connected to one or more supply ducts and the one or more supply ducts may further be connected to a plurality of variable air volume (referred hereinafter as "VAV") units placed inside the building. The AHU may also be connected to one or more return ducts drawing the air from inside the building and either releasing it back to the environment or partially mixing it with fresh air in the supply air duct. When the air from the AHU reaches the plurality of VAV units, the VAV units may use one or more diffusers to provide the air in different zones of the building. Each of the VAV units may be responsible for maintaining a desired temperature in each zone.

Moreover, each of the plurality of VAV units may comprise an airflow sensor for measuring airflow of the VAV units. Similarly, the AHU may also comprise am=n airflow sensor for measuring airflow within the AHU unit. Based on the airflow from the AHU unit and/or the airflow from the VAV units, calibration of one or more airflow sensors associated with one or more reference VAV units of the plurality of VAV units may be performed using a step measure technique or using a value of airflow of the one or more supply ducts measured by an airflow sensor of the air handling unit or by an airflow sensor in the one or more supply ducts. Also, a reference airflow value of the one or more reference VAV units may be determined based on the calibration of the one or more airflow sensors. The reference airflow value of the one or more airflow sensors may be taken as a reference for calibrating other sensors associated with other VAV units. Accordingly, the other sensors associated with the other VAV units of the plurality of VAV units may be calibrated by using the reference airflow value of the one or more reference VAV units. The operations and functions performed by the AHU and the VAV units have been explained below in greater details.

Throughout the specification, reference numeral 104 depicts different supply ducts in HVAC system. Each of the reference numerals 104A, 104B may be considered as a separate supply duct. Likewise, throughout the specification, reference numeral 106 depicts different VAV units. The reference numerals 106A-106C (106) may be considered as a separate VAV unit in the HVAC system. Similarly, throughout the specification, reference numeral 108 depicts different one or more diffusers. Each of the reference numerals 108A-108J may be considered as a separate diffuser. Lastly, throughout the specification, reference numeral 114 depicts different zones. Each of the reference numerals 114A-114D may be considered as a separate zone.

FIG. 1 depicts an exemplary system architecture 100 according to an exemplary embodiment of the invention. As depicted in FIG. 1, an air handling unit (AHU) 102 may be connected with one or more supply ducts, namely a first supply duct 104A and a second supply duct 104B. The first supply duct 104A may supply air (fresh or conditioned air) to a first VAV unit 106A and the second supply duct 104B may supply the air to a second VAV unit 106B as well as to a third VAV unit 106C. When the air reaches the first VAV unit 106A, the first VAV unit 106A may supply the air in a first zone 114A through one or more diffusers 108A, 108B and 108C. Further, the first VAV unit 106A may also supply the air in a second zone 114B through one or more diffusers 108D and 108E. Similarly, the second VAV unit 106B may supply the air in a third zone 114C through one or more diffusers 108F, 108G and 108H. Moreover, the third VAV unit 106C may supply the air in a fourth zone 114D through one or more diffusers 108J and 108K. Each of the VAV units 106 may maintain different temperature in each zone based on a temperature either desired by occupants in that particular zone or set by a user. In addition, the air present in each zone 114 may be returned/circulated back to the AHU 102 through one or more return ducts (not shown) connected to the VAV units 106 and to the AHU 102.

In order to perform air-balancing in each zone 114, a person 112 (may be a balancer or a technician) may perform calibration of one or more airflow sensors associated with one or more reference VAV unit 106A (taken as a reference) either using a step measure technique or using a value of airflow of the one or more supply ducts 104 measured by an airflow sensor of the air handling unit 102 or measured by an airflow sensor in the one or more supply ducts 104.

In an exemplary first embodiment, the calibration of the one or more airflow sensors associated with one or more reference VAV unit 106A may be performed by using a value of airflow of the one or more supply ducts 104 measured by an airflow sensor of the air handling unit 102.

In an exemplary second embodiment, the calibration of the one or more airflow sensors associated with one or more reference VAV unit 106A may be performed by using a value of airflow of the one or more supply ducts 104 measured by an airflow sensor in the one or more supply ducts 104.

In an exemplary third embodiment, the calibration of the one or more airflow sensors associated with one or more reference VAV unit 106A may be performed by using the step measure technique. The step measure technique may be used if the value of airflow of the one or more supply ducts 104 is not present through the first embodiment or the second embodiment. The step measure technique may be configured to perform calibration by following the below-mentioned procedure:

The person 112 may use a calibration unit 110 to perform calibration of the one or more airflow sensor associated with the one or more reference VAV unit 106A. In an exemplary embodiment, the calibration unit 110 may be a tool or an equipment for performing the calibration.

When the person 112 provides a value of maximum revolutions per minute (referred hereinafter as "RPM") of a fan (for 100% speed) of the AHU 102 in the calibration unit 110, the step measure technique in the calibration unit 110 may be configured to receive the value of maximum RPM of the fan and may be configured to determine a value of maximum cubic feet per minute (referred hereinafter as "CFM") based on the value of maximum RPM of the fan. In an exemplary embodiment, the value of the maximum CFM may be based on a maximum cooling airflow setpoint of the one or more reference variable air volume (VAV) unit 106A (if taken as a reference VAV unit) and a largest of maximum cooling airflow setpoint of the other variable air volume (VAV) units 106B, 106C. Then, the step measure technique in the calibration unit 110 may also be configured to open a damper associated with each of the variable air volume (VAV) units 106 (i.e. 100% open) and to switch on the fan of the AHU 102 to modulate at minimum speed (i.e. setpoint from the AHU 102). Also, the damper associated with each of the variable air volume (VAV) units 106 may start closing/opening slowly till a desired static pressure setpoint (setpoint from the AHU 102) is achieved.

Further, the person 112 may measure airflow in the one or more supply ducts 104 of the AHU 102 at ⅔rd distance using a duct traverse method that is well known in the art. The person 112 may measure the airflow before the air is served to any VAV duct. The person 112 may use differential pressure sensor & pilot tube. Then, the person 112 may enter a value of the airflow of the one or more supply ducts 104 in the calibration unit 110. The step measure technique in the calibration unit 110 may be configured to receive the value of the airflow of the one or more supply ducts 104 and may be configured to determine a value of fan speed based on the value of the airflow of the one or more supply ducts 104. This determination of the fan speed based on the value of the airflow of the one or more supply ducts 104 may be called as "a relation curve of fan speed to airflow curve". Also, the calibration unit 110 may also display a RPM value for the maximum CFM based on the value of the fan speed. Further, the step measure technique in the calibration unit 110 may be further configured to receive an input from the person 112 to use the determined value of the fan speed as a reference calibration airflow value. Alternatively, the person 112 may provide an input to the calibration unit 110 to determine a new value of the fan speed. In that case, the step measure technique in the calibration unit 110 may be configured to modulate the fan speed (to 'maximum cfm required' rpm value) for determining a new value of the fan speed based on a new value of the airflow of the one or more supply ducts 104 if the input to determine the new value of the fan speed is received from the person 112. And, if the new value of the fan speed is determined, then the new value of the fan speed may be taken as a reference calibration airflow value. Thereby, the calibration of the one or more airflow sensors associated with the one or more reference VAV unit 106A is performed using the step measure technique as per the exemplary third embodiment. Moreover, the calibration of the one or more airflow sensors associated with the one or more reference VAV unit 106A is performed by maintaining minimum fan speed to keep the other VAV units 106B, 106C closed.

After the calibration of the one or more airflow sensors associated with the one or more reference VAV unit 106A is performed, the calibration unit 110 may calibrate the other sensors associated with the other VAV units 106B, 106C when the person 112 choose a "Calibrate all other VAV units" option provided in the calibration unit 110. The calibration unit 110 may set the one or more reference VAV units 106A (i.e. if taken as reference VAV) to maximum flow setpoint and may be configured to close the other VAV units 106B, 106C associated to the AHU 102. If in case, minimum fan speed setpoint is same as current speed, then closing process of the other VAV units 106B, 106C may be paused. Such a closing process of the other VAV units 106B, 106C may comprise completely turning of the other VAV units and/or or completely closing dampers of the other VAV units so that the air does not pass through it.

In such a situation, the calibration unit 110 may generate an alarm to reduce the minimum fan speed setpoint. If minimum fan speed cannot be changed, then the person 112 may need to mark more VAV units as reference VAV units and balance these VAV units manually till minimum speed is meet. Once alarm is fixed, the calibration of the other VAV units 106B, 106C may be continued from where the one or more reference VAV unit 106A is open and the other VAV units 106B, 106C are closed. The calibration unit 110 may be configured to determine a fan speed of the AHU 102 and determine a value of airflow of the AHU 102 based on the determined fan speed. The calibration unit 110 may also be configured to determine leakage airflow based on a difference between the value of airflow of the AHU 102 & a value of airflow of the one or more reference VAV unit 106A or sum of airflow of all reference VAV units if more than one VAV unit has been taken as reference.

The person 112 may start calibrating a second sensor associated with a second VAV unit 106B by setting the second VAV unit 106B to maximum flow setpoint and determining a value of the airflow of the second VAV unit 106. The value of the airflow of the second VAV unit 106B may be determined once the air handling unit 102 is stabilize at one speed. Also, the calibration unit 110 may be configured to determine fan speed of the AHU 102 & determining a total airflow of the AHU 102. The calibration unit 110 may be configured to determine an airflow of the second VAV unit 106B based on a difference of the value of the airflow of the AHU 102, the leakage airflow and the reference calibration airflow value. The calibration unit 110 may be configured to determine a maximum flow calibration offset CFM value based on a difference of the equated airflow of the second VAV unit 106B and a measured value of a controller of the second VAV unit 106B. Thereby, the calibration of the second VAV unit 106B (or the other VAV unit) is completed. Similarly, by following the same procedure, the third VAV unit 106C may also easily be calibrated. The embodiment of calibrating the other sensors based on the reference calibration airflow value provides the technical advantage of reducing the time taken to manually calibrate each VAV unit for performing air balancing. This embodiment of the invention also provides the technical advantage of fast and easy calibration of other VAV units based on the reference calibration airflow value.

The present invention has been described with respect to the calibration of other sensors associated with other variable air volume (VAV) units based on calibration of the one or more reference sensors associated with the one or more reference VAV unit 106A (i.e. one reference VAV unit). However, the calibration of other sensors associated with the other VAV units may also be performed by first calibrating two or more VAV units and then taking these two or more VAV units as reference VAV units to calibrate the other VAV units. Taking these two or more VAV units as reference VAV units may be required when there are a large/huge number of VAV units which are to be calibrated. In such a situation, performing calibration of the other sensors associated with the other VAV units by taking a single reference VAV unit would not be appropriate. Therefore, taking these two or more VAV units as reference VAV units would be required in such kind of situation.

The present invention encompasses the calibration unit 110 to allow to calibrate each sensor associated with each of the VAV units 106A within a range of an error percentage. Such range of the error percentage may be in the range of 5%-20%. This range may be configured by the person 112. Each of the plurality of VAV units 106 and the AHU 102 may provide value/s to a building management system (BMS) server through a network. The calibration unit 110 may be capable of reading data from the BMS server over BACnet protocol. Alternatively, the calibration unit 110 may operate standalone and capable of reading data from any protocol network.

The present invention also encompasses the calibration unit 110 to abort the calibration of any of the plurality of VAV units 106 when a safety alarm is detected or an alarm/abort button is pressed by the person 112. Also, the calibration unit 110 may provide an alarm when the leakage airflow reaches above a pre-defined threshold. Further, the calibration unit 110 may control on/off of the AHU 102 using point reference name expression or schedule. Moreover, as the calibration unit 110 has knowledge of the fan speed to the airflow relation through the step measure technique, such relation may be passed to the AHU 102, wherein the AHU 102 may display a current airflow for the fan speed.

As used herein, the term "maximum cooling airflow setpoint" or "maximum flow setpoint" may refer to a point in a controller of the VAV unit 106 which holds fix values of maximum allowable airflow (in cfm). Such a VAV unit shall be serving to a zone 114. At the time of the design, this value may be selected based on zone size & its heat load requirement. Based on zone maximum cfm requirement, a duct size may be defined. Also, larger the zone more the VAV size (VAV damper Diameter) & more the maximum cooling airflow setpoint value. Similarly, smaller the zone size, smaller the VAV size (VAV damper Diameter) & lesser the maximum cooling airflow setpoint value.

As used herein, the term "largest of maximum cooling airflow setpoint" may refer to a largest value of all maximum cooling airflow setpoint associated to each selected VAV unit for auto calibration. The air handling unit may be serving too many VAV units which are of different sizes. Also, different maximum cooling airflow setpoint value may be different for each VAV.

As used herein, the term "supply fan Minimum speed" or "minimum fan speed setpoint" may refer to setpoint value settable in a controller of the air handling unit. It is minimum speed in 'Percentage' in which AHU supply fan is allowed to run.

As used herein, the term "static Pressure Setpoint" may refer to a setpoint value settable in a controller of the air handling unit. It is used to control AHU supply fan speed to achieve AHU supply duct at a mention static pressure.

Figure 2:
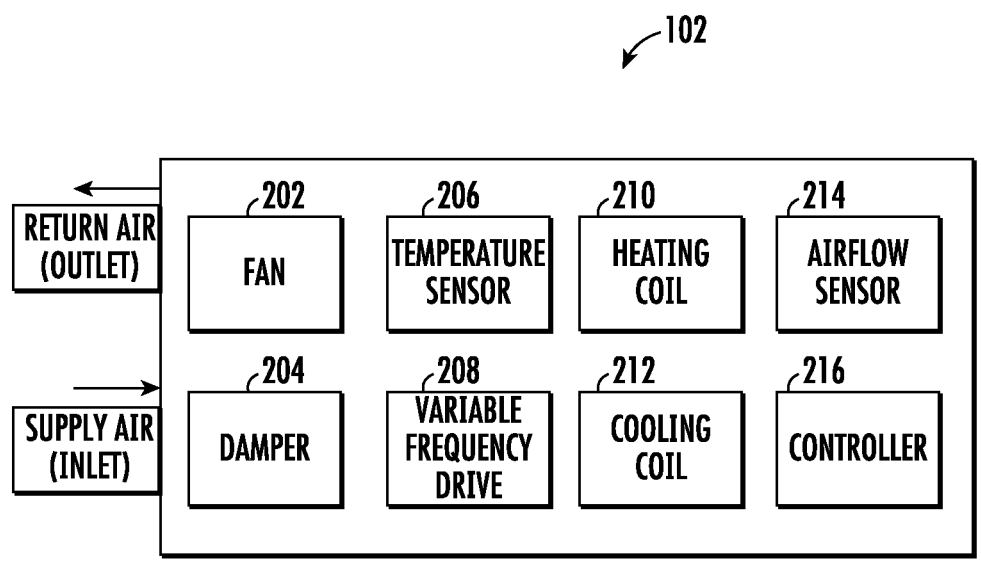
FIG. 2 depicts block diagram of different components of an exemplary air handling unit according to an exemplary embodiment of the invention.

FIG. 2 depicts block diagram of different components of an exemplary air handling unit (AHU) 102 according to an exemplary embodiment of the invention. The AHU 102 may comprise of, but is not limited to, one or more fan/s 202, damper/s 204, temperature sensor/s 206, a variable frequency drive (VFD) 208, heating coil 210, cooling coil 212, an airflow sensor 214 and/or a controller 216. The one or more fan/s 202 may be adapted to draw air from the surroundings/environment and may be adapted to provide air to the heating coil 210 if heating is to be maintained in zones 114 or to the cooling coil 212 if cooling is to be maintained. The other fan/s of the one or more fan/s 202 may also be adapted to draw the air outside from the AHU 102. The damper/s 204 may be adapted to select appropriate return air & outside air to provide fresh air to each VAV unit 106 in a building and remaining to use return air to retain the cold air. The temperature sensor/s 206 may be adapted to sense temperature of the air in the AHU 102 and may communicate the sensed temperature to the controller 216. The variable frequency drive 208 may be adapted to modulate speed of the fan 202 and may also be adapted to provide RPM value of the fan 202. The airflow sensor 214 may be adapted to sense airflow in the AHU 102 and may communicate the sensed airflow to the controller 216. The controller 216 may be adapted to control operations of the AHU 102 and may also provide command/s to the fan 202, the damper/s 204, the cooling coil 212 and/or the heating coil 210. Moreover, the controller 216 may be adapted to receive inputs from a static pressure sensor (not shown), the temperature sensor/s 206 and/or the airflow sensor 214. The static pressure sensor may be installed in the one or more supply ducts 104 and may be wired to the controller 216. Such static pressure sensor may be adapted to measure pressure inside one or more supply ducts 104 and may provide a value of the measured pressure to the controller 216. The value of measured pressure inside one or more supply ducts 104 is important for air balancing automation technique.

Figure 3:
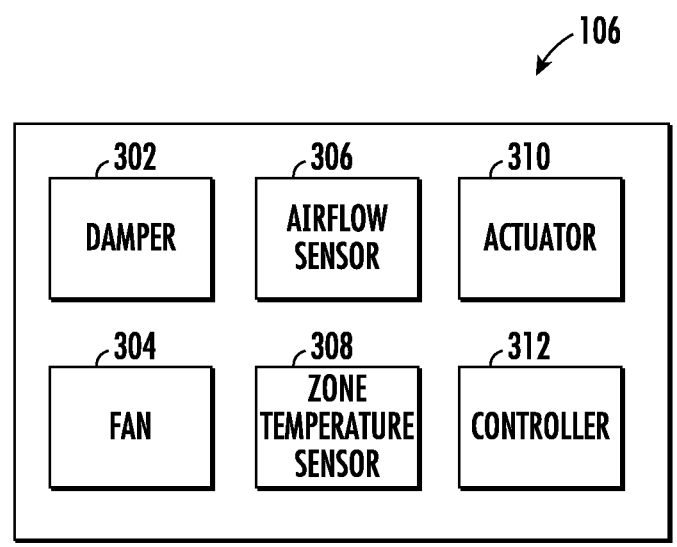
FIG. 3 depicts block diagram of different components of an exemplary variable air volume (VAV) unit according to an exemplary embodiment of the invention.

FIG. 3 depicts block diagram of different components of an exemplary variable volume (VAV) unit 106 according to an exemplary embodiment of the invention. The VAV unit 106 may comprise of, but is not limited to, damper/s 302, fan/s 304, an airflow sensor 306, a zone temperature sensor 308, an actuator 310 and/or a controller 312. The zone temperature sensor 308 may be adapted to sense temperature in a zone 114. The controller 312 may be adapted to provide a command to the actuator 310 for changing or maintaining a position of the damper 302 based on the requirement of a desired temperature and to allow the air to pass through it.

The airflow sensor 306 may be adapted to sense a flow of air in the VAV unit 106 and may communicate the sensed airflow to the controller 312. The controller 310 may also be adapted to control operations of the VAV unit 106 such as receiving temperature value from the zone temperature sensor 308, controlling temperature in each zone 114 based on cooling temperature setpoint to be achieved, deriving airflow setpoint which will be between minimum airflow setpoint & cooling maximum airflow setpoint for cooling operation. The fan/s 304 (optional) may be adapted to provide or draw air from the VAV unit 106.

Figure 4:
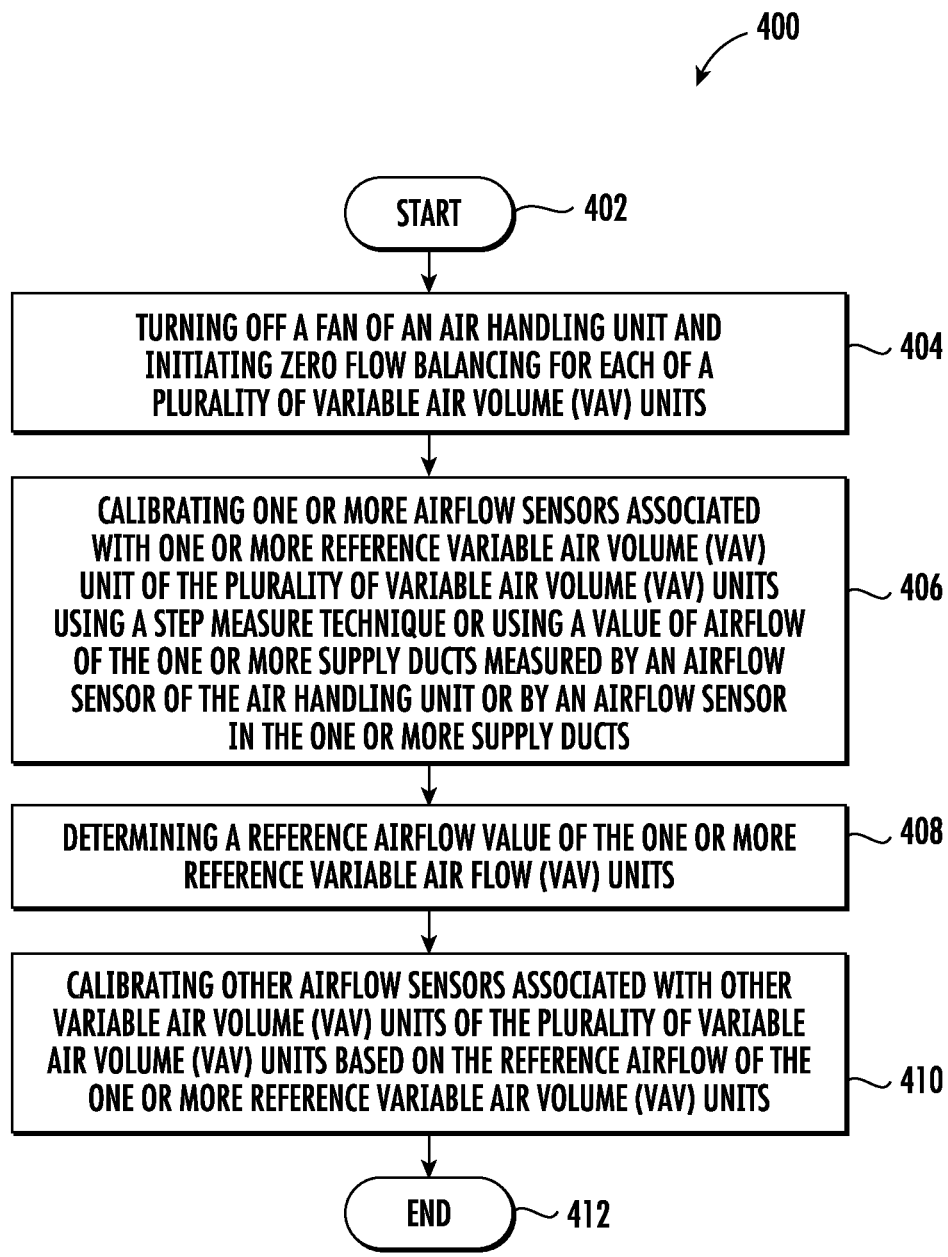
FIG. 4 depicts an exemplary flowchart illustrating a method to perform the invention according to an exemplary embodiment of the invention.

FIG. 4 depicts a flowchart outlining the features of the invention in an exemplary embodiment of the invention. The method flowchart 400 describes a method being for performing calibration of variable air volume (VAV) units in a HVAC system. The method flowchart 400 starts at step 402.

At step 404, a calibration unit 110 may turn off a fan of an air handling unit (AHU) 102 and may also initiate zero flow balancing for each of a plurality of variable air volume (VAV) units 106. This has been discussed in greater details in FIG. 1 above.

At step 406, the calibration unit 110 may calibrate one or more airflow sensors associated with one or more reference VAV units 106A of the plurality of VAV units 106 using a step measure technique or using a value of airflow of the one or more supply ducts 104 measured by an airflow sensor of the air handling unit 102 or by an airflow sensor in the one or more supply ducts 104. This has been discussed in greater details in FIG. 1 above.

At step 408, the calibration unit 110 may determine a reference airflow value of the one or more reference variable air volume (VAV) units 106A. This has been discussed in greater details in FIG. 1 above.

At step 410, the calibration unit 110 may calibrate other airflow sensors associated with other VAV units 106B, 106C of the plurality of VAV units 106 based on the reference airflow value of the one or more reference variable air volume (VAV) units 106A. This has been discussed in greater details in FIG. 1 above. Then, the method flowchart 400 may end at 412.

Figure 5A:
FIG. 5A depicts "Test and Balance" tab for calibration of a reference VAV unit in calibration unit.

FIG. 5A depicts an exemplary interface showing calibration of a reference VAV unit in the calibration unit 110 according to an exemplary embodiment of the invention. As can be seen, in the left side of the FIG. 5A, a building may have 5 AHUs (i.e. air handling unit), namely AHU1, AHU2, AHU3, AHU4 and AHU5. Also seen in the left side of the FIG. 5A, a list of VAV units under each AHU as described in FIG. 1 and a person 112 in FIG. 5A has selected VAV11 as reference VAV unit under AHU4 for calibration. As soon as the person 112 selects the VAV11 as reference VAV unit for performing calibration, "damper open position" under "Test and Balance" tab may be configured and a value of airflow may be determined by the calibration unit 110 based on a value of airflow measured by airflow sensor/s in the VAV11.

FIG. 5B depicts "Locks" tab in the calibration unit 110 for performing calibration of VAV11 as reference VAV unit. Also, the damper associated with the VAV11 may start closing/opening slowly till a desired static pressure setpoint is achieved. Through these options, the person 112 may decide a final damper open position at a particular value and lock the damper position at that particular value. In this case, the person 112 has decided to open the damper of the VAV11 at 30% for VAV11.

Figure 5C:
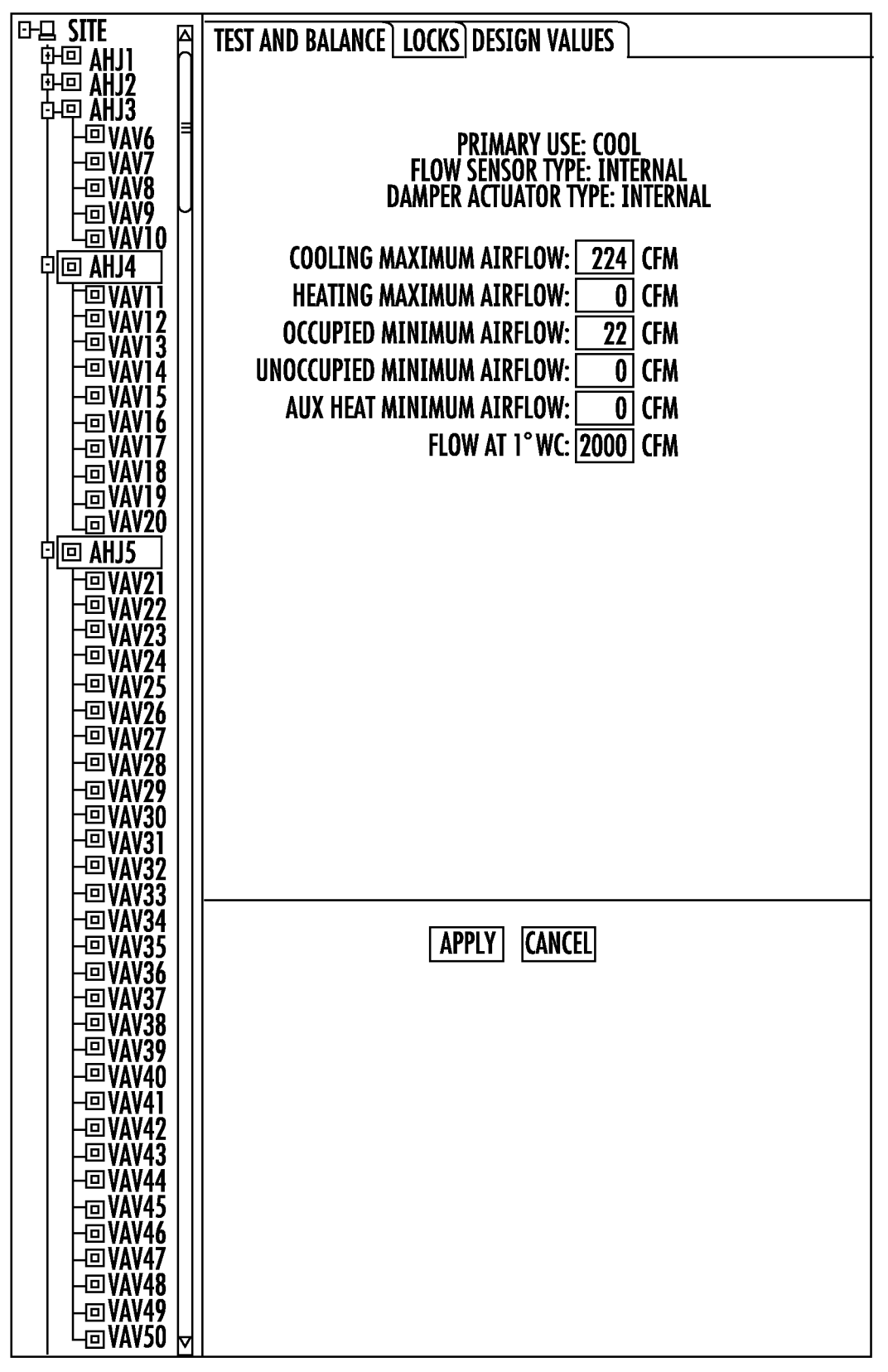

FIG. 5C depicts "Design Value" tab in the calibration unit 110 for performing calibration of VAV11 as reference VAV unit. Through this tab, values of several airflows (such as maximum cooling, maximum heating etc.) may be determined for VAV11.

Figure 5D:
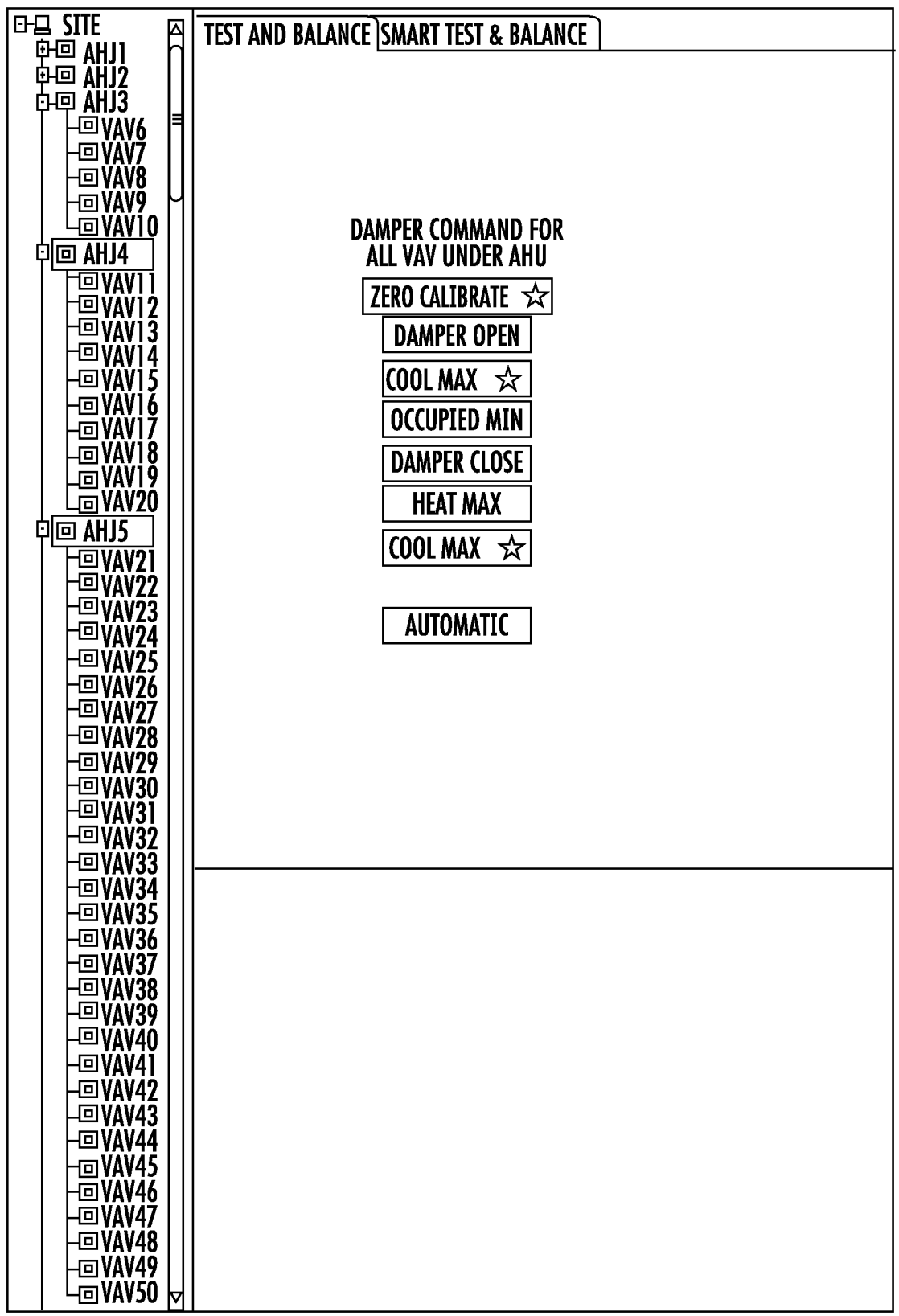

FIG. 5D depicts "Test and Balance" tab in the calibration unit 110 for performing calibration of AHU4 which also has VAV11. This includes damper command for all VAVs under AHU4. As can be seen, "Zero Calibrate" option may enable zero flow balancing for all the VAV units served by AHU4.

FIG. 5E depicts "Smart Test and Balance" tab in the calibration unit 110 for performing calibration of AHU4 which also has VAV11 and other VAVs under AHU4. As can be seen in "Status Table", reference VAVs may be selected by the person 112 and based on a value of airflow of reference VAVs (in this case VAV11, VAV12), other VAVs served by AHU4 may be calibrated. The "Status Table" also shows damper position, a value of airflow, a value of airflow setpoint and calibration status of each VAVs under AHU 4. Further, on the right top side of the FIG. 5E, a value of fan speed of AHU4, a value of static pressure of AHU, a value of airflow of AHU4 etc. are provided. Moreover, on the left top side of the FIG. 5E, "Assign Airflow" option may be used either to use step measure technique or use a value of airflow measured by an airflow sensor of AHU4 or the supply ducts in the AHU4.

The interface shown in FIGS. 5A-5E is exemplary and is not limited to the components illustrated herein.

The present invention is applicable in various industries/fields such as, but is not limited to, banking industry, hospitality industry, housing industry, building/construction industry, offices, universities, hospitals, colleges, homes and any such industry/field that is well known in the art and where the HVAC systems are used.

The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a calibration unit 110. A computer readable medium comprises one or more processors and a memory coupled to the one or more processors, the memory stores instructions executed by the one or more processors. The one or more processors are configured to turn off a fan of an air handling unit 102 and initiate zero flow balancing for each of a plurality of variable air volume (VAV) units 106. The one or more processors are also configured to calibrate one or more airflow sensors associated with one or more reference variable air volume (VAV) units 106A of the plurality of variable air volume (VAV) 106 units using a step measure technique or using a value of airflow of the one or more supply ducts 104 measured by an airflow sensor of the air handling unit 102 or by an airflow sensor in the one or more supply ducts 104. The one or more processors are also configured to determine a reference airflow value of the one or more reference variable air volume (VAV) units 106A and calibrate other airflow sensors associated with other variable air volume (VAV) units 106B, 106C of the plurality of variable air volume (VAV) units 106 based on the reference airflow value of the one or more reference variable air volume (VAV) units 106A.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "controller" can refer to substantially any processor or computing processing unit or device comprising, but not limited to comprising, a direct digital control of a HVAC system, a zone controller of the HVAC system, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
    an air handling unit connected to one or more supply ducts and the one or more supply ducts connected to a plurality of variable air volume (VAV) units; and
    a calibration unit configured to:
    turn off a fan of the air handling unit and initiate zero flow balancing for each of the plurality of variable air volume (VAV) units;
    calibrate one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts;
    determine a reference airflow value of the one or more reference variable air volume (VAV) units; and
    calibrate other airflow sensors associated with other variable air volume (VAV) units of the plurality of variable air volume (VAV) units based on the reference airflow value of the one or more reference variable air volume (VAV) units.

2. The system of claim 1, wherein the step measure technique is configured to:
    receive a value of maximum revolutions per minute (RPM) of the fan;
    determine a value of maximum cubic feet per minute (CFM) based on the value of maximum RPM of the fan;
    open a damper associated with each of the plurality of variable air volume (VAV) units and switch on the fan to modulate at minimum speed;

receive a value of the airflow of the one or more supply ducts of the air handling unit;

determine a value of fan speed based on the value of the airflow of the one or more supply ducts of the air handling unit;

display an RPM value for the maximum cubic feet per minute (CFM) based on the value of the fan speed;

receive an input to use the determined value of the fan speed as the reference airflow value or receive an input to determine a new value of fan speed; and modulate the fan speed to determine a new value of the fan speed based on a new value of the airflow if the input to determine the new value of the fan speed is received.

3. The system of claim 2, wherein the value of the maximum CFM is based on a maximum cooling airflow setpoint of the one or more reference variable air volume (VAV) units and a largest of maximum cooling airflow setpoint of the other variable air volume (VAV) units.

4. The system of claim 1, wherein the calibration of the one or more airflow sensors associated with the one or more reference variable air volume (VAV) units and the other airflow sensors associated with the other variable air volume (VAV) units is allowed within a range of an error percentage.

5. The system of claim 1, wherein the calibration of the one or more airflow sensors associated with the one or more reference variable air volume (VAV) units are performed by maintaining minimum fan speed to keep the other variable air volume (VAV) units closed.

6. The system of claim 1, wherein the calibration unit is configured to calibrate the other airflow sensors associated with the other variable air volume (VAV) units by:

setting the other variable air volume (VAV) units to maximum flow setpoint and determining a value of the airflow of the air handling unit;

determining fan speed & determining a total airflow of the air handling unit;

determining an airflow of a current VAV based on a difference of the value of the airflow of the air handling unit, a leakage airflow and the reference airflow value; and determining a maximum flow calibration offset CFM value based on a difference of the airflow of the current VAV and a measured value of the current VAV.

7. The system of claim 1, wherein the calibration unit is configured to abort the calibration of the plurality of variable air volume units when a safety alarm is detected or an alarm/abort button is pressed.

8. The system of claim 1, wherein the system provides an alarm when the leakage airflow reaches above a pre-defined or a user-adjustable threshold.

9. The system of claim 1, wherein the air handling unit is configured to display a current airflow for the fan speed.

10. The system of claim 1, wherein each of the plurality of variable air volume units is connected to one or more diffusers.

11. A method comprising:

turning off a fan of an air handling unit and initiating zero flow balancing for each of a plurality of variable air volume (VAV) units;

calibrating one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts;

determining a reference airflow value of the one or more reference variable air volume (VAV) units; and calibrating other airflow sensors associated with other variable air volume (VAV) units of the plurality of variable air volume (VAV) units based on the reference airflow value of the one or more reference variable air volume (VAV) units.

12. The method of claim 11, wherein the step measure technique further comprises steps of:

receiving a value of maximum revolutions per minute (RPM) of the fan;

determining a value of maximum cubic feet per minute (CFM) based on the value of maximum RPM of the fan;

opening a damper associated with each of the plurality of variable air volume (VAV) units and switching on the fan to modulate at minimum speed;

receiving a value of the airflow of the one or more supply ducts of the air handling unit;

determining a value of fan speed based on the value of the airflow of the one or more supply ducts of the air handling unit;

displaying a RPM value for the maximum cubic feet per minute (CFM) based on the value of the fan speed;

receiving an input to use the determined value of the fan speed as the reference airflow value or an input to determine a new value of fan speed; and modulating the fan speed to determine a new value of the fan speed based on a new value of the airflow if the input to determine the new value of the fan speed is received.

13. The method of claim 12, wherein the value of the maximum CFM is based on a maximum cooling airflow setpoint of the one or more reference variable air volume (VAV) units and a largest of maximum cooling airflow setpoint of the other variable air volume (VAV) units.

14. The method of claim 11, wherein the calibration of the one or more airflow sensors associated with the one or more reference variable air volume (VAV) units and other airflow sensors associated with the other variable air volume (VAV) units is allowed within a range of an error percentage.

15. The method of claim 11, wherein the calibration of the one or more airflow sensors associated with the one or more reference variable air volume (VAV) units are performed by maintaining minimum fan speed to keep the other variable air volume (VAV) units closed.

16. The method of claim 11, wherein the calibration of the other airflow sensors associated with the other variable air volume (VAV) units comprises the steps of:

setting the other variable air volume (VAV) units to maximum flow setpoint and determining a value of the airflow of the air handling unit;

determining fan speed & determining a total airflow of the air handling unit;

determining an airflow of a current VAV based on a difference of the value of the airflow of the air handling unit, a leakage airflow and the reference airflow value; and determining a maximum flow calibration offset CFM value based on a difference of the airflow of the current VAV and a measured value of the current VAV.

17. The method of claim 11, wherein an alarm is provided when the leakage airflow reaches above a pre-defined or a user-adjustable threshold.

18. The method of claim 11, wherein the air handling unit is configured to display a current airflow for the fan speed.

19. The method of claim 11, wherein the calibration unit is configured to abort the calibration of the plurality of variable air volume units when a safety alarm is detected or an alarm/abort button is pressed.

20. A computer readable medium comprising one or more processors and a memory coupled to the one or more processors, the memory storing instructions executed by the one or more processors, the one or more processors configured to:
- turn off a fan of an air handling unit and initiate zero flow balancing for each of a plurality of variable air volume (VAV) units;
- calibrate one or more airflow sensors associated with one or more reference variable air volume (VAV) units of the plurality of variable air volume (VAV) units using a step measure technique or using a value of airflow of the one or more supply ducts measured by an airflow sensor of the air handling unit or by an airflow sensor in the one or more supply ducts;
- determine a reference airflow value of the one or more reference variable air volume (VAV) units; and
- calibrate other airflow sensors associated with other variable air volume (VAV) units of the plurality of variable air volume (VAV) units based on the reference airflow value.

* * * * *